(12) United States Patent
Levitan

(10) Patent No.: US 6,965,913 B2
(45) Date of Patent: Nov. 15, 2005

(54) SYSTEM FOR PSEUDO-INTERACTIVE INTERNET ACCESS

(75) Inventor: Gutman Levitan, Stamford, CT (US)

(73) Assignee: Virtel Corporation, Stamford, CT (US)

(*) Notice: Subject to any disclaimer, the term of this patent is extended or adjusted under 35 U.S.C. 154(b) by 934 days.

(21) Appl. No.: 09/829,255

(22) Filed: Apr. 10, 2001

(65) Prior Publication Data

US 2002/0147769 A1 Oct. 10, 2002

(51) Int. Cl.[7] .............................................. G06F 15/16
(52) U.S. Cl. ...................... 709/203; 709/217; 709/219; 725/87; 725/91; 725/95
(58) Field of Search ................................. 709/203, 217, 709/219, 202, 229, 231; 725/91, 93, 95, 46, 725/47, 61, 87

(56) References Cited

U.S. PATENT DOCUMENTS

| | | | | |
|---|---|---|---|---|
| 5,940,071 A | * | 8/1999 | Treffers et al. | 345/721 |
| 5,961,602 A | * | 10/1999 | Thompson et al. | 709/229 |
| 5,991,306 A | * | 11/1999 | Burns et al. | 370/429 |
| 6,442,598 B1 | * | 8/2002 | Wright et al. | 709/217 |
| 6,477,707 B1 | * | 11/2002 | King et al. | 725/97 |
| 6,510,556 B1 | * | 1/2003 | Kusaba et al. | 725/93 |
| 6,594,682 B2 | * | 7/2003 | Peterson et al. | 718/102 |
| 6,625,643 B1 | * | 9/2003 | Colby et al. | 709/217 |
| 6,665,659 B1 | * | 12/2003 | Logan | 707/3 |
| 6,757,912 B1 | * | 6/2004 | Vaughan et al. | 725/139 |
| 6,801,936 B1 | * | 10/2004 | Diwan | 709/219 |
| 2001/0047419 A1 | * | 11/2001 | Gonno et al. | 709/229 |

* cited by examiner

Primary Examiner—John Follansbee
Assistant Examiner—Aaron C. Perez-Daple
(74) Attorney, Agent, or Firm—Ilya Zborovsky

(57) ABSTRACT

The invention is an Internet access system reducing Internet traffic and delays in content presentation. It puts together interactivity of the Internet and congestion-free content delivery inherent in broadcast radio and television. An access server located at a broadcast center receives clients requests for Internet objects (web pages, music files etc.) via a two-way medium, downloads from the Internet a single copy of that object no matter how many clients have requested the object and then retransmits the copy in a broadcast manner so that all clients requested the same object could download it simultaneously. The system provides a repeated transmission of objects in high demand to reduce interaction between Internet clients and access server while operating in two modes of content delivery: an immediate delivery on request and a planned delivery according to a schedule. In both modes users receive Internet content of their choice at the time of their choice.

2 Claims, 4 Drawing Sheets

SYSTEM FOR PSEUDO-INTERACTIVE INTERNET ACCESS

BACKGROUND OF THE INVENTION

This invention relates to information technology for convergence of television and the Internet.

There are currently two major developments in the intersection of television and the Internet: Internet TV and cable modem. An Internet TV appliance displays Web pages on a television screen using it as computer monitor and therefore the appliance does not need a separate monitor—an expensive part of PC. Philips Consumer Electronics, Sony Electronics and Mitsubishi Consumer Electronics of America are manufacturing WebTV, a set-top box based on technology developed by WebTV unit of Microsoft. WebTV provides Internet access over dial-up phone modem and does not addresses problems of Internet traffic and slow downloading of multimedia files.

The more important development, cable modem, provides broadband Internet access via cable television line. Pioneering enterprises in the field are At Home, Redwood City Calif., and Road Runner, a joint venture of MediaOne Group of Denver, Microsoft and Time Warner. Cable modem is 100 to 200 times faster in downstream than dial-up phone modem and as a result it eliminates a major Internet bottleneck—so-called "last-mile connection". Deployment of cable modems necessitates an expensive conversion of conventional one-way cable TV network into two-way addressable network similar to telephone. Satellite television has developed its counterpart of cable modem—DirecPC from Hughes Network Systems, Germantown, Md. DirecPC provides download data rate up to 400 kb/s, which is 10 to 20 times slower than cable modem.

Faster modems eliminate only one Internet bottleneck while explosive grows of number of Internet users, popular portals and high-volume online retail create congestion and, as a result, delays beyond the "last mile". Moreover, faster modems intensify Web surfing and encourage rich media on Web sites, and thus contribute to Internet traffic on servers and routers. First DSL and cable modem users may experience relief but if most of Internet users go this way the long waiting time will be back.

Popular Web sites experience thousands or even millions of "hits" daily and when they get too busy, additional requests are rejected to avoid excessive delays. This is called "denial of service". Yahoo, Amazon, e-Bay and some other famous, state-of-the-art sites were shut down by hackers using so-called "denial-of-service attack". The attack is a flood of artificially created traffic and it constitutes one of the greatest threats because victims have virtually no defense against it. To filter out dummy requests a site needs to detect spoofed return addresses or other suspicious things while hackers are doing everything to make it difficult.

The cause of Internet traffic is addressable delivery: a separate copy of Internet content is delivered to each user even when many users ask for the same content. In a broadcast system such as radio and television there is no traffic because all recipients of the same content are connected (tuned) to the same channel and thus receive the same "copy" of content. This fundamental difference between addressable and broadcast media will exist forever and neither digital compression nor faster modems can eliminate it.

A technology for reducing Internet traffic called "multicast" is promoted as Internet version of broadcast (see Savetz et al. "MBONE: Multicasting Tomorrow's Internet", IDG, 1996). Multicasting is a technique of sending a packet of data to multiple computers at the same time instead of sending packets to one computer at a time. For implementation of multicast all Internet infrastructure needs to be rebuilt starting with Internet Protocol—the major standard that enables information exchange between different computers throughout the world.

More practical method for reducing Internet traffic is Web caching, i.e. storing frequently accessed Web pages closer to users instead of fetching them each time from original distant sites whenever the pages are requested. Caching software, Inktomi Traffic Server, is available from Inktomi Corp., San Mateo, Calif.

The common feature of the referred prior art is addressable delivery of Internet files. This invention is further development of information technology disclosed in U.S. Pat. No. 5,864,823 and two other pending patent applications by the same applicant. The technology puts together interactivity of the Internet and traffic-free feature of television. As a result, Internet content becomes available for users any time with no delay. In addition, the technology facilitates photographic quality of picture and television quality of video eliminating need in excessive compression that sacrifices resolution. And what is also important, the technology is supplemental rather than intrusive: its implementation does not require any change to existing infrastructure and standards of television and the Internet. The U.S. Pat. No. 5,864,823 claims a system for distribution of multimedia advertisements to interested recipients only over one-way television channels and transmission of orders from recipients to advertisers over the Internet, and a system for electronic delivery of all kinds of high-volume entities such as newspapers, magazines, books, music, video and computer software over television while advancing access data to authorized recipients over the Internet. In pending application Ser. No. 09/179,375 the technology is developed for delivery of Web pages and other high-volume content from Internet sources. The application describes an automatic downloading of Web pages of user's choice at a time of their scheduled transmission via one-way TV channels so that whenever user wants to see such a page it would have been in his computer and therefore presented instantly. In pending application Ser. No. 09/336,846 the technology is further developed to provide also interactive downloading, i.e. immediate downloading on request. The application claims a client/server system in which an Internet client communicates with an Internet server via telephone sending a request for a certain Internet file and receiving back a number of TV channel selected by the server for transmission of the requested file. Then the client switches its channel selector to the TV channel and downloads the file transmitted by the server. If many clients ask for the same file all of them will get it simultaneously from the same channel. In other words, the system combines a two-way addressable exchange of low-volume control information with a one-way broadband broadcast of high-volume content in order to overcome both slow downloading and traffic jams.

This invention presents an improvement of the technology of Internet access via TV channels that further limits two-way addressable exchange between server and clients.

SUMMARY OF THE INVENTION

Accordingly, it is an object of the present invention to eliminate Internet traffic providing simultaneous delivery of the same copy of Internet content to unlimited number of users in a broadcast manner while minimizing two-way addressable interaction between server and client computers.

Another object is to provide a cost-effective Internet access as a result of dramatic decrease in the two-way addressable interaction.

A further object of the invention is photographic quality of picture and television quality of audio/video delivered from Internet sources as a result of traffic-free delivery and fast downloading over multiple TV channels that make excessive digital compression unnecessary. Without compression that sacrifices resolution Web sites might function as richly illustrated magazines, cyber show rooms, art exhibitions and virtual television stations.

A still further object is to improve security of Web sites, in particular, eliminating possibility of so-called "denial-of-service attack", which is an artificially created traffic.

In keeping with these objects and with others which will become apparent hereinafter, a feature of present invention resides, briefly stated, in an Internet server that receives clients requests for Internet files over a telephone network, downloads the requested files from Internet sources and then retransmits them over television channels in order that an unlimited number of client computers could simultaneously download the same copy of each file. The server supplies client computers with a timetable of the broadcast transmission so they could automatically control channel selectors for downloading requested files from TV channels. The server continue to repeatedly transmit each Internet file during a period of time proportional to a number of clients requested that file while client computer sends a request to server for a file requested by user only if the file has not been scheduled for transmission.

The novel features, which are considered as characteristic for the present invention, are set forth in particular in the appended claims. The invention itself, however, both as to its construction and its method of operation together with additional objects and advantages thereof, will be best understood from the following description of specific embodiments when read in connection with the accompanying drawings.

BRIEF DESCRIPTION OF THE DRAWING FIGURES

DESCRIPTION OF THE PREFERRED EMBODIMENTS

Figure 1:
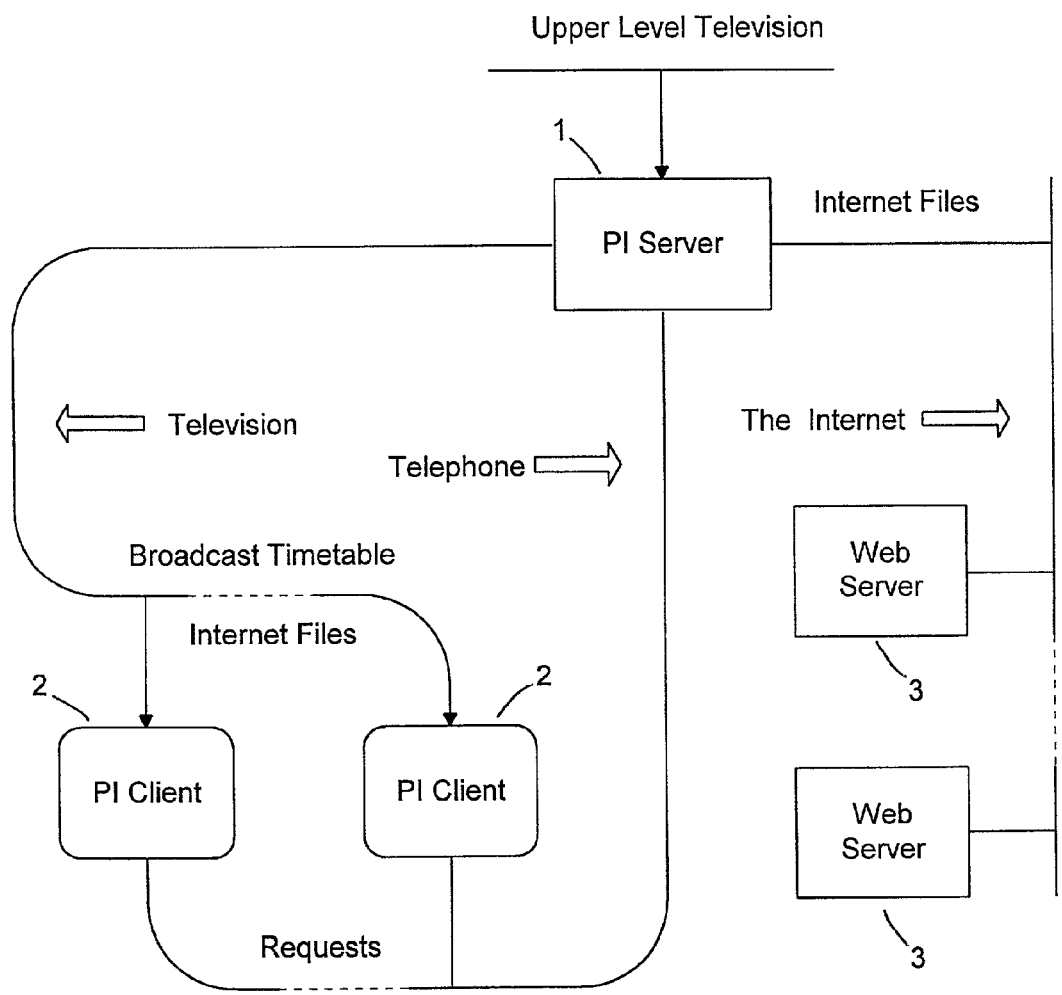
FIG. 1 is a block diagram of an integrated communication system providing pseudo-interactive Internet access.

A block diagram of the system providing Internet access via one-way TV channels is shown on FIG. 1. An Internet server 1 receives requests for Internet files from Internet clients 2 over a telephone network and compose a selection list of Internet files that contains all files requested by clients and in addition, some other frequently requested files. The server downloads the files of the selection list from Web servers 3 over the Internet and retransmits them in a broadcast manner over a television medium such as cable, satellite or over-the-air terrestrial broadcast system. The server broadcasts in advance a timetable of the transmission so that client computers could automatically control channel selectors (tuner cards) connecting them to the television medium for downloading those files that are requested by their users. In order to minimize client/server interaction via telephone, server continues to repeatedly retransmit each Internet file during a period of time proportional to a number of clients requested that file while client sends a request to server for a file selected by its user if and only if the file has not been scheduled for transmission.

For user, this mode of Internet access is interactive because user receives a content of his choice in response to his request but for user's computer it looks more like a reception of content transmitted in broadcast manner. For this reason the technique is referred herein as pseudo-interactive Internet access. Accordingly, Internet server and Internet client providing the access are referred as Pseudo-Interactive (PI) Server and PI Client respectively.

The convergence technique puts together interactivity of the Internet and free of any traffic feature of television. On the Internet, which is a two-way addressable computer network, a separate copy of requested file is delivered to each user on the user's address even when many users ask for the same file. As a result, the Internet is subject to traffic jams. In a broadcast system such as radio and television there is no traffic because all recipients of the same content are connected (tuned) to the same channel and thus receive the same "copy" of content. There are much more Internet users than Internet servers, therefore if Internet content moves between servers via the Internet accordingly to TCP/IP protocol and from servers to clients as a traffic-free broadcast in a digital television format, the delivery becomes faster and consumes less computing and communication resources.

It is even more so because servers are connected directly to the Internet over dedicated high-speed communication lines while multiple television channels present the fastest way for final delivery of Internet files from servers to clients. One standard 6 MHz TV channel transfers 19.4 Mb/s of data, which is approximately 10,000 pages of text or 100 full-screen pictures per second, and which is at least 2 times faster than cable modem, 13 times faster than DSL modem and 500 times faster than dial-up phone modem. And again, unlimited number of computers requesting the same Internet content can simultaneously download the content transmitted in broadcast manner on a TV channel, which does not happen with dial-up, cable and DSL modems where a separate copy of content is delivered individually to each computer on its network address.

So far the most efficient way to reduce Internet traffic has been Web caching. To reduce traffic and waiting time Internet service providers are storing frequently accessed Web pages on their own servers instead of fetching them anew from original distant sites whenever the pages are requested by users. Caching on a PI Server is especially efficient because one copy of a page mirrored on the server can be simultaneously delivered to unlimited number of users. Most of Web sites however are visited only occasionally. You may not expect traffic on such a site or on a way to it and therefore it should not take too long to bring a page from the site original host to PI Server and then deliver the page to PI Client via one of TV channels still bypassing the slow "last mile" connection via phone line.

The traffic-free, virtually instant delivery of Internet files facilitates photographic quality of picture and television quality of audio/video delivered from Internet sources. On the Internet, all files storing images, audio and video are compressed to make their transfer faster and thereby avoid excessive delays in delivery. Generally, the more compression, the faster transfer and the worth picture. As soon as delays in delivery and capacity of client file storage are not issues any more the compression can be limited to a level where it does not sacrifice resolution. The quality is very important for Internet entertainment, advertising and shopping. On the traffic-free Internet any Web site can operate as a richly illustrated magazine, a three-dimensional show room, an art exhibition or a virtual television station.

Note that while pseudo-interactive access facilitates rich media on the Internet it does not require any change in existent Internet infrastructure. It is still user's choice how to access the Internet: via dial up, cable or DSL modem, or via a PI Client. However some Internet content intended for PI clients will be too "heavy" for addressable modems. For example, it may take up to 7 hours to download a 1.5-hour movie over cable modem.

The pseudo-interactive access improves also security of Web sites eliminating possibility of so-called denial-of-service (DOS) attack. Popular sites may experience thousands or even millions of "hits" daily and when they get too busy, additional requests are rejected to avoid excessive delays. This is called "denial of service". The DOS attack is a flood of artificially created traffic and it constitutes one of the greatest threats because victims have virtually no defense against it. To filter dummy requests out a site needs to detect spoofed return addresses or other suspicious things while hackers are doing everything to make it difficult. One of their confusing technique is distributed (DDOS) attack. The pseudo-interactive access eliminates traffic no matter is it natural or artificial and therefore it eliminates a possibility of denial of service. Whatever is the flood of "hits", only one copy of content is transmitted over a TV channel so that every client could select (tune to) the channel and download the copy.

Figure 2:
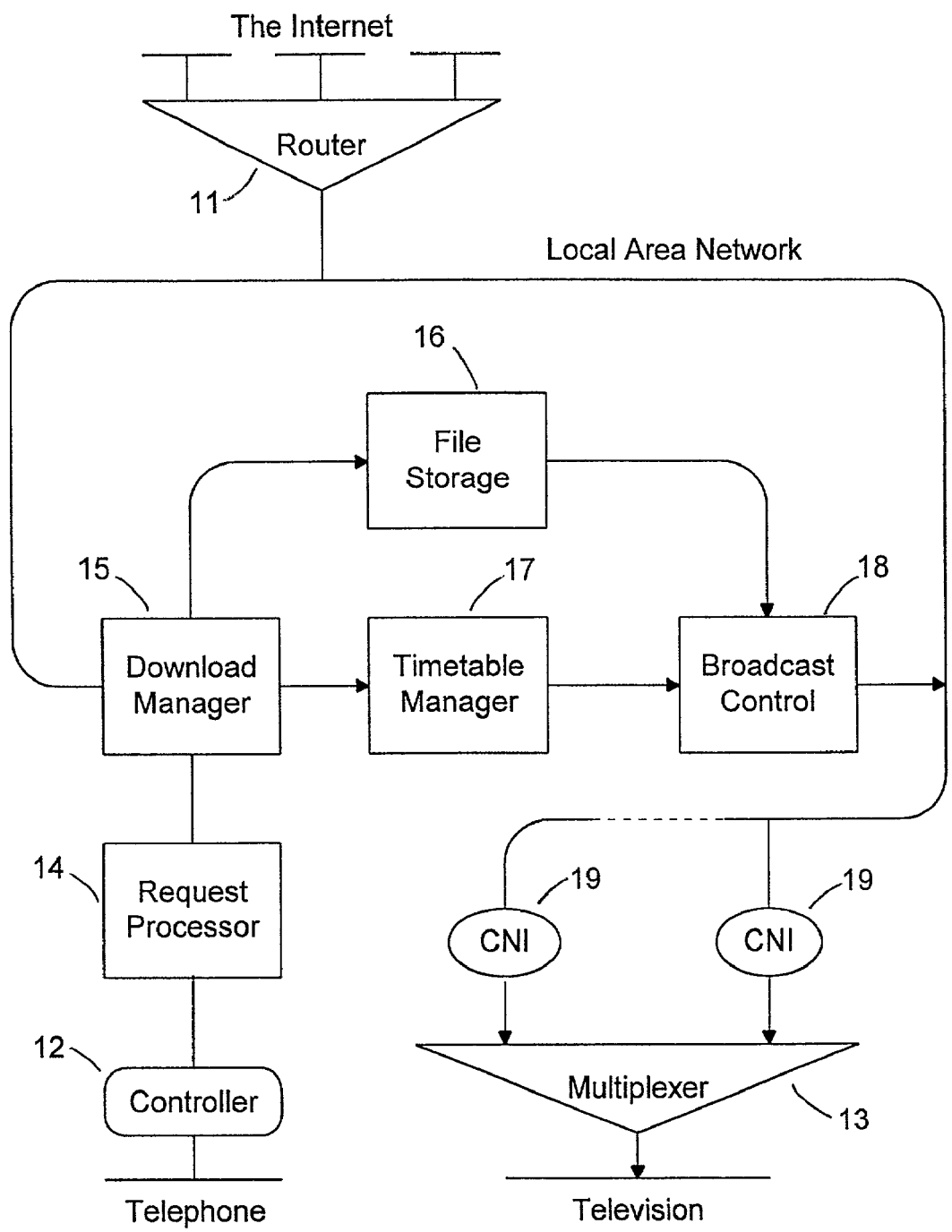
FIG. 2 is a block diagram showing details of server side of the integrated communication system.

A block diagram of PI Server is shown on FIG. 2. The server is, in fact, a group of computers connected in a local area network (LAN) at a television transmission center. The LAN is connected to the Internet over a router 11, to telephone over a controller 12 and to a one-way television medium over a multiplexer 13. The computers are running a number of application programs providing server functionality. Depending on a computing power needed for an application, a computer may run one or several applications and the same application may be supported by many computers. An application, Request Processor 14, receives clients' requests for Internet files over the controller 12 and composes a server selection list of Internet files containing all files requested by clients. In addition, the selection list contains some frequently requested files providing information of common interest such as news, weather, stock quotes and so on. Another application, Download Manager 15, obtains the server selection list from the Request Processor and download files of the selection list from their hosts connected to the Internet throughout the world. The downloaded files are stored in a File Storage 16 on high-capacity direct-access devices. A Timetable Manager 17 receives a list of downloaded files from the Download Manager and schedules broadcast transmission of the files over television channels. It composes a broadcast timetable listing each file to be transmitted with a time and a channel of its transmission. Accordingly to the broadcast timetable a Broadcast Control 18 provides files transfer from the File Storage 16 to the Multiplexer 13 via channel network interfaces CNI 19. An input of Multiplexer is input of a television channel. Each CNI has a LAN address and is a final point of addressable delivery accordingly to TCP/IP protocol. At that point files are uploaded in a certain television channel and further transmitted in a digital television format such as MPEG-2. The broadcast timetable file is transmitted over a channel known to PI Clients and every updated version of the timetable precedes any Internet file listed in that version.

Figure 3:
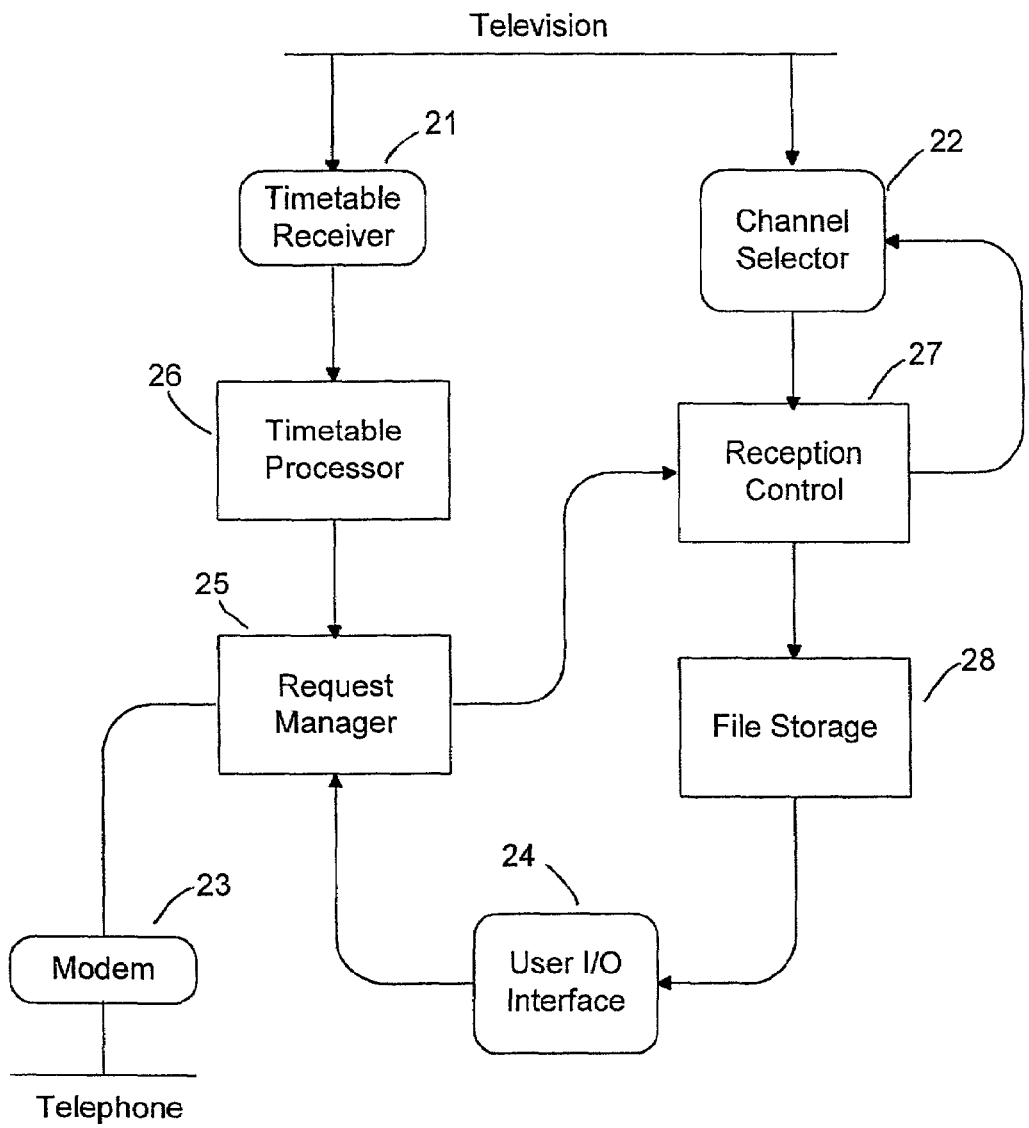
FIG. 3 is a block diagram showing details of client side of the integrated communication system.

A block diagram of PI Client, which is also a combination of hardware and software, is shown on FIG. 3. The client is connected to television over a timetable receiver 21 and a channel selector 22. Both of them are tuners but it is preferable to have a separate receiver for timetable file operating permanently and independently from a channel selector intended for reception of requested Internet files from multiple TV channels. The client is connected to telephone over a modem 23. User submits a request for Internet content such as web pages over a user input/output interface 24, which will be discussed hereafter. An application Request Manager 25 identifies Internet files requested by user while a Timetable Processor 26 obtains a broadcast timetable from the receiver 21. If a requested file is listed in the broadcast timetable the Request Manager determines its transmission time and channel and passes the data to a Reception Control 27. If and only if the requested file is not listed in the broadcast timetable, the Request Manager sends a request for that file to server over the modem 23, waits for a new version of the broadcast timetable in which the file is listed and then passes time/channel data of that file to the Reception Control. The Reception Control is coupled with the channel selector 22 to provide downloading of each requested file at the time and from the channel of its transmission. Downloaded files are stored in a File Storage 28 and presented to user via the input/output interface 24.

There are two modes of pseudo-interactive delivery of Internet files: immediate delivery on user's request and planned in advance delivery accordingly to a schedule. The former provides "surfing" of the Internet to explore new areas or to visit sites of occasional interest. The latter however takes full advantage of broadcast providing instant access to information of frequent or permanent interest such as news, weather, shopping and all kinds of personal accounts stored on web sites of banks, mutual funds, utilities and so on. The planned in advance transmission is also the most effective for delivery of high-volume entities such as movies on demand, music, electronic books, catalogs and computer software. Accordingly, there are two types of requests sent by PI clients and two separate timetables provided by PI server.

For immediate delivery, client submits a stand-alone, one at a time request. Server composes a server selection list of Internet files that contains all files explicitly requested by clients plus some files in large demand so that clients could get those files without sending requests. In the today's Internet, if a million of users want to see a web page during a day a server provides million transmissions of that page—one for each user. The PI server will broadcast the page every 2 seconds that is 43,200 times during a day (24 hours), which is 23 times less than one million. There are however cases of sudden and temporary interest to a particular web site such as one that posted Ken Starr's report in 1998. NASA web site experienced several million hits shortly after the automatic laboratory landed on Mars. PI server manages the cases as the following. When getting hits from many PI Clients for a particular file, PI Server retrieves the file from its Internet host and starts a permanent broadcast retransmission of the file with short intervals such as 2 seconds, and continues the transmission for a number of minutes proportional to a number of clients requested the file. During that time an unlimited number of interested users receives the file while their computers do not send requests to the server. If after the time expiration server gets hits again, it starts a new cycle of broadcast and so on. If the number of hits goes up the broadcast cycles gets longer and if the number of hits goes down, the broadcast cycles gets shorter. Eventually when users' interest is over, server stops the transmission.

For planned delivery, PI client composes and stores a user's selection list of Internet files. The client Request Manager compares the selection list with a timetable of planned transmissions provided by PI Server and sends a request for those and only those files of the user's selection list that are not present in the timetable. On the other side, the server schedules a periodical transmission of each requested file at least as frequently as the file is updated so that clients would always have the last version of the file downloaded, stored and presented to user instantly on user's request. Server continues the periodical transmission for a number of days proportional to a number of clients requested the file. During that time an unlimited number of interested users receives the file while their computers do not send requests to the server. If after the time expiration server gets requests again, it starts a new cycle of broadcast and so on. If the number of requests goes up the broadcast cycles gets longer and if the number of requests goes down, the broadcast cycles gets shorter. If no requests are submitted, server terminates transmission until a new request for that file comes up.

Client requests sent to server have to specify files selected by users and in most of cases even do not need return addresses to be included because the requested files are not sent to those addresses but transmitted in broadcast manner. On the Internet, every file is identified by its Uniform Resource Locator (URL) that comprises a site name, a directory or a hierarchy of directories of files stored on that site and eventually, a file name. In any case a number of bits required for URL representation, although bigger than a phone number, is still small enough to go from client to server over phone line in the same way as phone number does, i.e. without establishing actual connection over switched circuits used for voice transmission. Phone numbers are transmitted via telephone signaling system, which is a data communication network laid over carrier's switching network for transmission of dial tones, bell signals, busy and ring-no-answer signals. In addition to the call setup part of phone call, which is not paid part of the call, the network provides, for a reasonable flat fee, advanced services such as 800 numbers, call waiting, call forwarding, three-way calling, voice mail and caller ID display. With client requests carrying over the signaling system, user does not need a separate phone line for Internet access because actual connection via switching circuits that makes a phone line permanently busy will be necessary only for sending long e-mail messages or uploading files attached to e-mail. Reception of messages and downloading attached files still may be done via television channels. On the other side, Internet service provider does not need pay for local phone numbers because signaling system services are paid on a flat fee basis. That makes pseudo-interactive access cost-effective for both users and service providers.

Client requests for files intended for authorized users include return addresses in order that access data necessary for reception of files transmitted via one-way television could be sent individually to each authorized client via telephone, in particular, the telephone signaling system. When delivered in a broadcast manner, files may be protected against unauthorized reception in four ways. First, files may be encrypted and encryption key sent via phone to authorized clients only. Second, transmission time and channel may be not included in the timetable but instead delivered individually to each authorized client. Third, the access data sent individually to each user by phone—time/channel of the transmission and key used for encryption of file—can be encrypted themselves by a client public key so that the data could be decrypted only in client that stores the matching private key. Forth, the broadcast itself may be conducted via virtual rather than physical channels as it is disclosed in U.S. Pat. No. 5,280,497. A combination of encryption with transmission on virtual (pseudo-randomly hopping) channels creates a deadlock for attackers: while signal hopping makes an encrypted file not available for cryptoanalysis, encryption makes hopeless any attempt to select and put together parts of the file transmitted on different physical channels using some kind of resemblance between those parts. In other words, any of the two protections cannot be even attacked before the other is defeated.

Note that PI Server may operate also as PI Client of a system covering a wider geographical area (see FIG. 1). For example, a server associated with a regional cable TV headend may receive some high-demand Internet files transmitted in a broadcast manner via a geostationary satellite. This is a way to bypass traffic on Internet routers and, by the way, this is how TV programs of national networks such as CBS and NBC are delivered to cable TV headends. On the other hand, PI Client may operate also as a server in a local or small (home) area network. Then other computers in the network will be provided with benefits of pseudo-interactive access without being connected to television and telephone.

Figure 4:
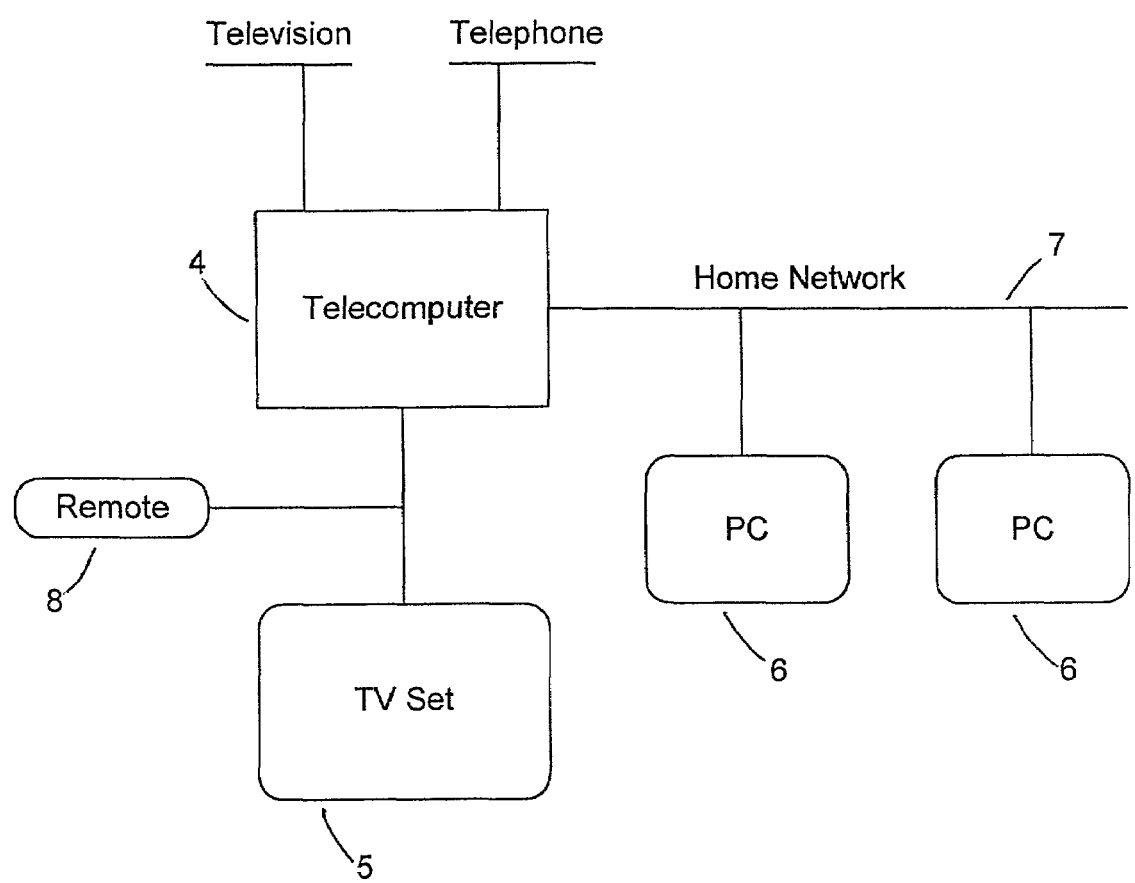
FIG. 4 is a block diagram showing a high-end client implemented as a home network.

FIG. 4 shows a block diagram of a high-end PI Client implemented as a home network. A "telecomputer" 4 is a cable box or a satellite receiver combined with a computer equipped with a high-capacity hard disk drive. Commercially available hard disks used in digital video recorders can store 40 hours of video or 14 million full-screen still pictures or more than one billion pages of text. The telecomputer is connected to both television and telephone. It is connected to a TV set 5 in order to output both conventional television programs and content delivered from Internet sources. One or more desktop computers 6 with keyboards, printers and scanners are connected to the telecomputer via a home network 7, wireless or otherwise, and therefore, the desktops may be located anywhere in the home and do not need to be connected to television or telephone. The desktops don't need a large hard drive or any hard drive at all because they can use the huge storage of the telecomputer 4, which is their network server. They also don't need a large monitor and high quality speakers because for presenting rich media content TV set 5 is better.

The integrated system provides the most comprehensive user's interface to conventional television, interactive television and the Internet. While desktop PC monitor is better positioned than TV screen for presenting content that is predominantly text, large TV screen is better for presenting content that is predominantly picture or video. User may very well use a remote control handset 8 for clicking links on web pages but it is definitely more convenient to type web addresses and compose selection lists of web sites sitting at the desk with a keyboard and mouse. You may check e-mail while TV screen runs a commercial but you prepare and send e-mail using your desktop. And anyway, everybody needs a TV set for entertainment and a PC for computer applications beyond Internet access.

While certain novel features of this invention have been shown and described and are pointed out in the annexed claims, it will be understood that various omissions, substitutions and changes in the forms and details of the devices illustrated and their operation can be made by those skilled in the art without departing from the spirit of the invention. In particular, the broadcast medium is not necessarily television, it could be a high-frequency radio or other one-way broadcast system while two-way addressable interaction between client and server may be provided over cellular phone, PCS, pager or any other addressable communication link.

I claim:

1. An Internet access system reducing Internet traffic and delays in content delivery comprising:

two-way addressable communication means for transmitting data between devices connected to the means by directing data to addresses assigned to the devices;

a broadcast multichannel medium for transmitting data in a broadcast manner;

a multichannel data transmitter provided at a transmission center and coupled to the broadcast multichannel medium;

a broadcast server located at the transmission center and coupled to said two-way addressable communication means for receiving requests for Internet objects from Internet clients and connected to the Internet via a network interface for downloading the requested objects from web servers located anywhere in the world and further coupled to said multichannel data transmitter for transmitting the downloaded Internet objects in a broadcast manner in order that Internet clients that requested the same object could download the object simultaneously;

said broadcast server operative for maintaining a server selection list of Internet objects requested by Internet clients and counting a number of clients that requested each object;

downloading only one copy of each object of the server selection list from its origin web server no matter how many clients have requested that object, thereby reducing Internet traffic;

selecting channels of said multichannel data transmitter for broadcast transmission of downloaded objects and maintaining a broadcast schedule specifying a transmission channel for each object to be transmitted;

transmitting the broadcast schedule on a channel known to Internet clients;

transmitting each Internet object on the channel specified for that object in the broadcast schedule;

retaining Internet objects requested by more than one client and repeatedly transmitting the objects with time intervals small enough so not to be considered as delays in content delivery;

continuing the transmission during a period of time determined for each object proportionally to the number of clients that requested the object in order that other clients whose users will request the object during that period of time could download the object without sending a request to the broadcast server, thereby further reducing Internet traffic and reducing delays in content delivery;

at recipient side, a multichannel data receiver coupled to said broadcast multichannel medium for receiving data transmitted by said multichannel data transmitter;

an Internet client coupled to the multichannel data receiver so to be able to switch channels of the receiver and obtain data transmitted on different channels, and further coupled to said two-way addressable communication means for sending requests to said broadcast server;

said Internet client being operative for obtaining a user request for an Internet object;

receiving said broadcast schedule over a channel of said multichannel data receiver;

identifying a channel specified in the broadcast schedule for transmission of the Internet object requested by the user if the object is included in the broadcast schedule;

sending a request to the broadcast server only if the object requested by the user is not included in the broadcast schedule, thereby reducing interaction with the broadcast server, and waiting until the object will be included in the broadcast schedule;

switching said multichannel data receiver to the channel specified in the broadcast schedule for transmission of the Internet object requested by the user;

downloading the object from that channel; and presenting the object to the user.

2. An Internet access system reducing Internet traffic and delays in content presentation comprising:

two-way addressable communication means for transmitting data between devices connected to the means by directing data to addresses assigned to the devices;

a broadcast multichannel medium for transmitting data in a broadcast manner;

a multichannel data transmitter provided at a transmission center and coupled to the broadcast multichannel medium;

a broadcast server located at the transmission center and coupled to said two-way addressable communication means for receiving requests for Internet objects from Internet clients and connected to the Internet via a network interface for downloading the requested objects from Internet servers located anywhere in the world and further coupled to said multichannel data transmitter for transmitting the downloaded objects in a broadcast manner so that Internet clients that requested the same object could download the object simultaneously;

said broadcast server operative for maintaining a server selection list of Internet objects requested by Internet clients and counting a number of clients that requested each object;

scheduling objects of the server selection list for broadcast transmission so to transmit objects requested by more than one client repeatedly during a period of time determined for each object proportionally to the number of clients that requested the object in order that other clients whose users will request the object during that period of time could download the object without sending a request to the broadcast server;

maintaining a broadcast schedule specifying a transmission time and a transmission channel for each object to be transmitted;

transmitting the broadcast schedule via a channel known to Internet clients;

downloading each Internet object included in the broadcast schedule from its origin web server before the time of scheduled broadcast transmission of that object;

limiting the download to only one copy of the object no matter how many clients have requested that object, thereby reducing Internet traffic;

transmitting only one copy of each Internet object at the time and on the channel specified for that object in the broadcast schedule;

at recipient side, a multichannel data receiver coupled to said broadcast multichannel medium for receiving data transmitted by said multichannel data transmitter;

an Internet client coupled to the multichannel data receiver so to be able to switch channels of the receiver and obtain data transmitted on different channels, and further coupled to said two-way addressable communication means for sending requests to said broadcast server;

said Internet client being operative for obtaining and storing a user's selection list of Internet objects;

receiving said broadcast schedule over a channel of said multichannel data receiver;

for each Internet object of the user's selection list, which is included in the broadcast schedule, identifying a time and a channel specified in the broadcast schedule for transmission of that object;

sending a request to the broadcast server only for those objects of the user's selection list, which are not included in the broadcast schedule, thereby reducing interaction with the broadcast server;

at a time specified in the broadcast schedule for transmission of an Internet object of the user's selection list, switching said multichannel data receiver to the channel specified in the broadcast schedule for transmission of that object;

downloading the object from that channel and, if necessary, replacing an old version of the object by a new one;

storing the object; and instantly presenting the stored object to the user at a time selected by the user, thereby reducing delays in content presentation.

\* \* \* \* \*